(12) United States Patent
Xu et al.

(10) Patent No.: US 12,518,435 B2
(45) Date of Patent: Jan. 6, 2026

(54) PROCESSING IMAGE DATA BY PRIORITIZING LAYER PROPERTY

(71) Applicant: QUALCOMM Incorporated, San Diego, CA (US)

(72) Inventors: Yongjun Xu, Beijing (CN); Nan Zhang, Beijing (CN); Wenkai Yao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 18/042,453

(22) PCT Filed: Oct. 19, 2020

(86) PCT No.: PCT/CN2020/121899
§ 371 (c)(1),
(2) Date: Feb. 21, 2023

(87) PCT Pub. No.: WO2022/082363
PCT Pub. Date: Apr. 28, 2022

(65) Prior Publication Data
US 2023/0326093 A1 Oct. 12, 2023

(51) Int. Cl.
*G06T 11/00* (2006.01)
*G06T 1/20* (2006.01)
*G06T 11/20* (2006.01)

(52) U.S. Cl.
CPC .......... *G06T 11/00* (2013.01); *G06T 1/20* (2013.01)

(58) Field of Classification Search
None
See application file for complete search history.

(56) References Cited

U.S. PATENT DOCUMENTS 9,542,626 B2  1/2017  Martinson et al.
10,489,915 B2 * 11/2019  Labbe .................. H04N 19/436
(Continued)

FOREIGN PATENT DOCUMENTS

CN  104145277 A  11/2014
CN  109167915 A   1/2019
(Continued)

OTHER PUBLICATIONS

Supplementary European Search Report—EP20957952—Search Authority—Munich—May 16, 2024.
(Continued)

*Primary Examiner* — James A Thompson
(74) *Attorney, Agent, or Firm* — Patterson + Sheridan LLP (57) ABSTRACT

Certain aspects of the present disclosure provide methods and apparatus for processing a plurality of layers of image data corresponding to a frame configured to be displayed on a display, the plurality of layers comprising a first subset of layers having respective bit-depths less than or equal to a threshold and a second subset of layers having respective bit-depths greater than the threshold. The method includes performing, by a first processor, composition processing of at least one first layer of the first subset of layers based on the at least one first layer having a respective bit-depth less than or equal to the threshold. The method further includes performing, by a second processor, composition processing
(Continued)

of at least one second layer of the second subset of layers based on the at least one second layer having a respective bit-depth greater than the threshold.

23 Claims, 5 Drawing Sheets

(56) References Cited

U.S. PATENT DOCUMENTS

| | | | |
|---|---|---|---|
| 2015/0103919 A1* | 4/2015 | Hattori | H04N 19/70 |
| | | | 375/240.26 |
| 2016/0335985 A1 | 11/2016 | Ebberson et al. | |
| 2016/0366408 A1 | 12/2016 | Edso et al. | |
| 2017/0200253 A1 | 7/2017 | Ling | |
| 2018/0018936 A1 | 1/2018 | Staudenmaier et al. | |
| 2018/0189922 A1 | 7/2018 | Chinnadurai et al. | |
| 2018/0350036 A1 | 12/2018 | Vanreenen et al. | |
| 2019/0149792 A1* | 5/2019 | Luo | G06T 5/50 |
| | | | 348/571 |
| 2020/0051202 A1 | 2/2020 | Tamatam et al. | |
| 2020/0183734 A1 | 6/2020 | Nemlekar | |
| 2020/0365118 A1* | 11/2020 | Zhang | G06T 1/60 |

FOREIGN PATENT DOCUMENTS

| | | |
|---|---|---|
| CN | 110362186 A | 10/2019 |
| CN | 110363831 A | 10/2019 |
| CN | 110377263 A | 10/2019 |
| CN | 110620935 A | 12/2019 |
| EP | 3270371 A1 | 1/2018 |
| EP | 4002281 A1 | 5/2022 |
| TW | 201434010 A | 9/2014 |
| WO | 2015056424 A1 | 4/2015 |

OTHER PUBLICATIONS

Taiwan Search Report—TW110135110—TIPO—Mar. 3, 2025.
International Search Report and Written Opinion—PCT/CN2020/121899—ISA/EPO—Jul. 15, 2022.
Yue S., et al., "GPU-Based Fast Viewing Technology", Radio Engineering, 2008, vol. 39, No. 9, 3 Pages.

* cited by examiner

PROCESSING IMAGE DATA BY PRIORITIZING LAYER PROPERTY

CROSS-REFERENCE TO RELATED APPLICATIONS

This application is a national stage application under 35 U.S.C. 371 of PCT/CN2020/121899, filed Oct. 19, 2020, which is hereby expressly incorporated by reference herein in its entirety as if fully set forth below and for all applicable purposes.

TECHNICAL FIELD

The present disclosure relates generally to processing systems and, more particularly, to one or more techniques for display or graphics processing.

BACKGROUND

Computing devices often use a graphics processing unit (GPU) to accelerate the rendering of graphical data for display, and use a display processing unit (DPU) to process the graphical data to send to a display panel for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution.

Computing devices, including smartphones, tablets, and wearable devices, may present graphical content on a display. In certain situations, image data of higher bit-depths or color depths, such as the presently trending 10-bit over the exiting 8-bit, are desired by consumers. Correspondingly, higher bit-depth (e.g., 10-bit) display panels are becoming a standard hardware configuration in computing devices. For example, some hardware manufacturers may desire high bit-depth (including high dynamic range) gaming, video recording, playback, still image capturing and processing, and animation, supported by high efficiency image file format for such high bit-depth content.

In some cases, high bit-depth content may be processed by hardware components that do not natively support the high bit-depth. For example, high bit-depth content publishers may often lead the existing market that use lower bit-depth graphical processing units that are nonetheless capable of processing (e.g., by converting and dithering) the high bit-depth content. Though compatible, processing the high bit-depth content using a low bit-depth processor, buffer, or display panel may cause issues such as flickering, or other craggy behavior. Accordingly, techniques for processing image data having high bit-depths that avoid such issues are desirable.

SUMMARY OF THE INVENTION

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

Certain aspects of the present disclosure provide a method for processing a plurality of layers of image data corresponding to a frame configured to be displayed on a display, the plurality of layers comprising a first subset of layers having respective bit-depths less than or equal to a threshold and a second subset of layers having respective bit-depths greater than the threshold. The method includes performing, by a first processor, composition processing of at least one first layer of the first subset of layers based on the at least one first layer having a respective bit-depth less than or equal to the threshold. The method further includes performing, by a second processor, composition processing of at least one second layer of the second subset of layers based on the at least one second layer having a respective bit-depth greater than the threshold.

Certain aspects of the present disclosure provide an apparatus for processing a plurality of layers of image data corresponding to a frame configured to be displayed on a display, the plurality of layers comprising a first subset of layers having respective bit-depths less than or equal to a threshold and a second subset of layers having respective bit-depths greater than the threshold. The apparatus includes a memory and a first processor configured to perform composition processing of at least one first layer of the first subset of layers based on the at least one first layer having a respective bit-depth less than or equal to the threshold. The apparatus further includes a second processor configured to perform composition processing of at least one second layer of the second subset of layers based on the at least one second layer having a respective bit-depth greater than the threshold.

Certain aspects of the present disclosure provide a non-transitory computer-readable medium having instructions stored thereon that, when executed by a set of processors comprising a first processor and a second processor, cause the set of processors to perform a method for processing a plurality of layers of image data corresponding to a frame configured to be displayed on a display. The plurality of layers comprises a first subset of layers having respective bit-depths less than or equal to a threshold and a second subset of layers having respective bit-depths greater than the threshold. The method includes performing, by the first processor, composition processing of at least one first layer of the first subset of layers based on the at least one first layer having a respective bit-depth less than or equal to the threshold. The method further includes performing, by the second processor, composition processing of at least one second layer of the second subset of layers based on the at least one second layer having a respective bit-depth greater than the threshold.

Certain aspects of the present disclosure provide a method for processing a plurality of layers of image data corresponding to a frame configured to be displayed on a display, the plurality of layers comprising a first subset of layers having respective values of a property that do not satisfy a threshold and a second subset of layers having respective values of the property that satisfy the threshold. The method includes performing, by a first processor, composition processing of at least one first layer of the first subset of layers based on the at least one first layer having a respective value of the property that does not satisfy the threshold. The method further includes performing, by a second processor, composition processing of at least one second layer of the second subset of layers based on the at least one second layer having a respective value of the property that satisfies the threshold.

Certain aspects of the present disclosure provide an apparatus for processing a plurality of layers of image data corresponding to a frame configured to be displayed on a display, the plurality of layers comprising a first subset of layers having respective values of a property that do not satisfy a threshold and a second subset of layers having respective values of the property that satisfy the threshold. The apparatus includes a memory and a first processor configured to perform composition processing of at least one first layer of the first subset of layers based on the at least one first layer having a respective value of the property that does not satisfy the threshold. The apparatus further includes a second processor configured to perform composition processing of at least one second layer of the second subset of layers based on the at least one second layer having a respective value of the property that satisfies the threshold.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Like numerals indicate like elements.

DETAILED DESCRIPTION OF THE EMBODIMENTS

In general, aspects disclosed herein provide techniques for processing a plurality of layers of image data corresponding to a frame to be displayed on a display. In certain aspects, the plurality of layers comprise a first subset of layers having respective bit-depths less than or equal to a threshold, and a second subset of layers having respective bit-depths greater than the threshold. It should be noted that certain aspects are described with respect to bit-depth as a layer property for determining which processor to use to process a layer, however, one or more other layer properties may similarly be used.

Bit-depths, bit depths, or color depths per pixel, refer to the number of bits indicating the brightness or color of a single pixel (e.g., red, green, or blue). The single pixel can be in a bitmapped image or a video framebuffer, used in capturing devices as well as playback devices. For example, an 8-bit pixel can display $2^8=256$ different intensities or colors; while a 10-bit pixel can display $2^{10}=1024$ different intensities or colors. Color display panels generally employ a red-green-blue (RGB) configuration, e.g., resulting in a 24-bit color image based on 8-bit pixels (i.e., 8-bits for each red, green, and blue pixels). Other color display panels may further include pixels of different colors, such as cyan, magenta, or yellow, or include additional RGB pixels (e.g., RGB pixels having a ratio other than 1:1:1, such as 1:2:1) to enable a richer gamut, improved abilities to alter gamma, or a wider dynamic range. As such, different color display panels may have different overall color depths when each pixel has the same bit-depths. The present disclosure generally refers to bit-depths for each pixel, but the techniques disclosed herein are equally applicable to different color depths, gamut, gamma, or other image properties pertinent to processing.

High bit-depths processors and display panels are gaining popularity among consumers. For example, smartphone manufacturers are actively developing end-to-end 10-bit high dynamic range (HDR) solutions, including, for example: "True HDR" gaming, "HDR10" video recording, "HDR10" and "HDR10+" playback, 10-bit still image and animation high efficiency image file format (HEIF). Such activities include updating pipelines and blocks, such as for camera, graphic processing unit (GPU), display processing unit (DPU) and display panel, to support 10-bit or higher image processing to improve visual performance. Normally, a portion of the incoming image data may be processed by the GPU. However, when the image data has a higher bit-depth than the native bit-depth of the framebuffer in the GPU, the image processing may be disrupted or delayed, causing flickering or interruption. For example, some consumers have reported display flicker issues or display abnormality issues when playing 10-bit contents on devices using 8-bit GPUs. The present disclosure, in certain aspects, provides techniques that overcome such known flickering issues.

A GPU may use a different gamut mapping algorithm than that of DPU composition. In addition, a GPU may compose the contents in one intermediate buffer, such as a frame buffer target (FBT), which is often 8-bit. Some of the 10-bit content may be lost when converting to the FBT format. Either or both of the different gamut mapping and the bit-depths conversion may contribute to the flickering or interruption mentioned above. In addition, when the DPU cannot process all incoming image data, the workload may be diverted (e.g., sending to GPU for processing) or queued, potentially causing flickering or interruption.

In general, a hardware composer (HWC) is expected to utilize DPU for composition, because the DPU often has a native high bit-depth processing specification for efficient processing (i.e., better performance and lower energy consumption). The present disclosure provides techniques to avoid GPU composition for high bit-depth contents, for example as much as possible, for avoiding the resulting flicker.

Due to various limitations of DPU, using DPU solely for all use cases in processing all incoming image data may be impractical. On the other hand, changing FBT format to floating-point 16 (FP16, or half precision) format may be cost prohibitive in many applications (e.g., requiring substantial hardware upgrades across the platform). Therefore, according to certain aspects of this disclosure, the DPU may be prioritized in processing image data of high bit-depths, and the DPU may be assisted by the GPU in processing other image data. As such, this disclosure provides several benefits. First, data accuracy for high bit depth contents is maintained while avoiding bottleneck not affected by the number of layers used, including in complex cases. Furthermore, high bit-depths content can be processed in high priority by the DPU, thus enjoying the DPU's power and performance efficiency.

In some examples, prioritizing processing high bit-depth image data using the DPU is achieved by defining a threshold for the bit-depth. For example, when processing a number of layers of image data corresponding to a frame, the layers include a first subset of layers having respective bit-depths less than or equal to the threshold (e.g., 8-bit, or a number of bits supported by the FBT of the GPU), and a second subset of layers having respective bit-depths (e.g., 10-bit) greater than the threshold. The GPU may then perform composition processing of at least one first layer of the first subset of layers (e.g., of 8-bit or lower bit-depth) based on the at least one first layer having a bit-depth equal to the threshold (e.g., 8-bit). The DPU may perform composition processing of at least one second layer of the second subset of layers based on the at least one second layer having a bit-depth (e.g., 10-bit), greater than the threshold (e.g., 8-bit). In certain aspects, when the DPU has capacity to perform composition processing of all the layers, both the first subset and second subset of layers are processed by the DPU. On the other hand, when the DPU does not have sufficient capacity to handle processing all the layers of image data, a mixer mode is used where the GPU performs composition processing of the second subset of layers. In yet some other aspects, when the DPU has a diminished or disabled capacity, more or all of the layers may be sent to the GPU to perform the composition processing.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory.

Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, examples disclosed herein provide techniques for processing a plurality of layers of image data corresponding to a frame configured to be displayed on a display. Examples techniques may improve display by avoiding flickering related to GPU processing high bit-depth image data. For example, this disclosure describes techniques for prioritizing high bit-depth graphics and/or display processing in DPU for any device that utilizes a display. Other example benefits are described throughout this disclosure.

As used herein, instances of the term "content" may refer to "layers of image data," "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit (GPU) or otherwise received by a display processing unit (DPU).

In some examples, as used herein, the term "display content" may refer to content generated by a processing unit configured to perform display processing. In some examples, as used herein, the term "display content" may refer to content generated by a display processing unit. Graphical content may be processed to become display content. For example, a GPU may output graphical content, such as a frame, to a buffer (which may be referred to as a framebuffer). A display processing unit (such as the DPU 127 of FIG. 1) may read the graphical content, such as one or more frames from the buffer, and perform one or more display processing techniques thereon to generate display content.

For example, a DPU may be configured to perform composition on one or more rendered layers to generate a frame. In some cases, a GPU may also be configured to perform composition on one or more rendered layers to generate a frame, such as when assisting DPU in doing the same. As another example, a DPU may be configured to compose, blend, or otherwise combine two or more layers together into a single frame. A DPU may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Figure 1:
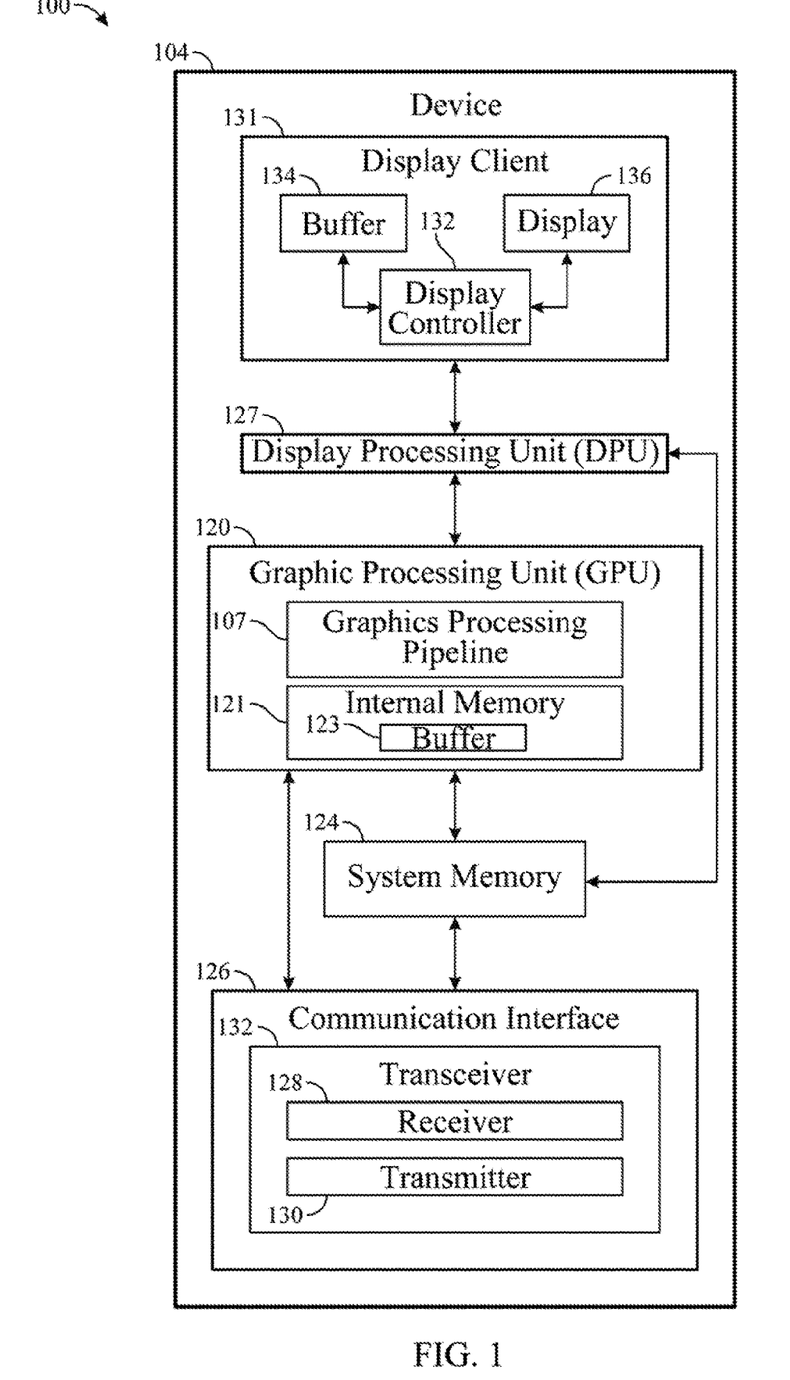
FIG. 1 is a block diagram that illustrates an example image data processing system, in accordance with one or more techniques of this disclosure.

FIG. 1 is a block diagram that illustrates an example image data processing system 100 configured to implement one or more techniques of this disclosure. The image data processing system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a graphic processing unit (GPU) 120 (e.g., a first processor) and a system memory 124. In some examples, the device 104 can include a number of additional or alternative components, e.g., a communication interface 126, a transceiver 132, a receiver 128, a transmitter 130, a display processing unit (DPU) 127 (e.g., a second processor), and a display client 131. Reference to the display client 131 may refer to one or more displays. For example, the display client 131 may include a single display or multiple displays. The display client 131 may include a first display and a second display. In further examples, the results of the graphics processing may not be displayed on the device, e.g., the first and second displays may not receive any frames for presentment thereon. Instead, the frames or graphics processing results may be transferred to another device. In some aspects, this can be referred to as split-rendering.

The GPU 120 may include an internal memory 121. The GPU 120 may be configured to perform graphics processing, such as in a graphics processing pipeline 107. In some examples, the device 104 may include a display processor, such as the DPU 127, to perform one or more display processing techniques, including composition processing, on one or more frames generated by the GPU 120 before presentment by the display client 131. The DPU 127 may be configured to perform display processing. For example, the DPU 127 may be configured to perform one or more display processing techniques on one or more frames generated by the GPU 120. The DPU 127 may output image data to the display client 131 according to an interface protocol, such as, for example, the MIPI DSI (Mobile Industry Processor Interface, Display Serial Interface).

The internal memory 121 may include a buffer 123, such as a framebuffer. The buffer 123 is a portion of the internal memory 121 containing a bitmap that may drive a video display, such as the display client 131. For example, the in-memory bitmap may be converted into a video signal that can be displayed on the display 136. The buffer 123 may also be a screen buffer, a video buffer, or a regeneration buffer that includes content to be shown on the display 136. The information in the buffer 123 may include bit-depth or color values (such as the aforementioned 24 bit-color for 8-bit pixels) for every pixel to be shown on the display 136. In some cases, the memory needed for the buffer 123 may depend on the resolution, the bit-depth, or the palette size of the output signal. In some aspects of the present disclosure, graphic content sent to the buffer 123 usually has the same bit-depth as the native bit-depth of the buffer 123, to avoid any potential abnormal composition processing that may result in flickering.

The display client 131 may be configured to display or otherwise present frames processed by the DPU 127. In some examples, the display client 131 may include one or more of: a liquid crystal display (LCD), a plasma display, an organic light emitting diode (OLED) display, a projection display device, an augmented reality display device, a virtual reality display device, a head-mounted display, or any other type of display device.

In the illustrated example of FIG. 1, the display client 131 includes a display controller 132, a buffer 134, and a display 136. The example display 136 includes a plurality of pixel elements for displaying image data. The display controller 132 may receive image data from the DPU 127 and store the received image data in the buffer 134. In some examples, the display controller 132 may output the image data stored in the buffer 134 to the display 136. Thus, the buffer 134 may represent a local memory to the display client 131. In some examples, the display controller 132 may output the image data received from the DPU 127 to the display 136.

Furthermore, as disclosed above, the display client 131 may be configured in accordance with MIPI DSI standards. The MIPI DSI standard supports a video mode and a command mode. In examples where the display client 131 is operating in video mode, the DPU 127 may continuously refresh the graphical content of the display client 131. For example, the entire graphical content may be refreshed per refresh cycle (e.g., line-by-line).

In examples where the display client 131 is operating in command mode, the DPU 127 may write the graphical content of a frame to the buffer 134. In some such examples, the DPU 127 may not continuously refresh the graphical content of the display client 131. Instead, the DPU 127 may use a vertical synchronization (Vsync) pulse to coordinate rendering and consuming of graphical content at the buffer 134. For example, when a Vsync pulse is generated, the DPU 127 may output new graphical content to the buffer 134. Thus, the generating of the Vsync pulse may indicate when current graphical content at the buffer 134 has been rendered.

Memory external to the GPU 120, such as system memory 124, may be accessible to the GPU 120. For example, the GPU 120 may be configured to read from and/or write to external memory, such as the system memory 124. The GPU 120 may be communicatively coupled to the system memory 124 over a bus. In some examples, the GPU 120 and the system memory 124 may be communicatively coupled to each other over the bus or a different connection.

It should be appreciated that in some examples, the device 104 may include a content encoder/decoder configured to receive graphical and/or display content from any source, such as the system memory 124 and/or the communication interface 126. The system memory 124 may be configured to store received encoded or decoded content. In some examples, the content encoder/decoder may be configured to receive encoded or decoded content, e.g., from the system memory 124 and/or the communication interface 126, in the form of encoded pixel data. In some examples, the content encoder/decoder may be configured to encode or decode any content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The GPU 120 may be a central processing unit (CPU), a graphics processing unit (GPU), a general purpose GPU (GPGPU), or any other processing unit that may be configured to perform graphics processing. In some examples, the GPU 120 may be integrated into a motherboard of the device 104. In some examples, the GPU 120 may be present on a graphics card that is installed in a port in a motherboard of the device 104, or may be otherwise incorporated within a peripheral device configured to interoperate with the device 104. The GPU 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the GPU 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the image data processing system 100 can include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

In some examples, the graphical content from the GPU 120 for display via the display client 131 is not static and may be changing. Accordingly, the DPU 127 may periodically refresh the graphical content displayed via the display client 131. For example, the DPU 127 may periodically retrieve graphical content from the system memory 124, where the graphical content may have been updated by the execution of an application (and/or the GPU 120) that outputs the graphical content to the system memory 124.

It should be appreciated that while shown as separate components in FIG. 1, in some examples, the display client 131 (sometimes referred to as a "display panel") may include the DPU 127.

Referring again to FIG. 1, in certain aspects, the DPU 127 may be configured to operate functions of the display client 131. For example, in certain aspects, the DPU 127 is configured to output a plurality of code words, such as corresponding to a frame, to the display controller 132. Each code word may be represented by a binary number in the digital domain. Each code word may correspond to a pixel (e.g., red, green, blue, white, etc.) of the display 136.

The display controller 132 may be configured to convert the code words received from the DPU 127 to analog signals used to drive the pixels of the display 136. In certain aspects, for each code word corresponding to a pixel, the display controller 132 is configured to convert the code word to an analog signal(s) that drives the pixel to a particular brightness level. Accordingly, in certain aspects, the code word and/or analog signal(s) correspond to a brightness level for the pixel.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

In certain aspects, it may be desirable to prioritize using the DPU 127 for composition processing of image data having high bit-depths, such as 10-bits, over the GPU 120 because the buffer 123 in the GPU 120 has a lower bit-depth framebuffer, such as a 8-bit framebuffer target. However, due to the amount of image data to be processed and the image data having a variety of properties, it is often impractical to rely on solely the DPU 127 to process all of the image data in some use cases. In case some of the image data is processed by the GPU 120, the device 104 operates in a "mixer mode" that makes use of the processing powers of both the DPU 127 and the GPU 120. For example, when the DPU 127 cannot timely process all image data, part of the image data is diverted to the GPU 120 for processing. The subset of image data diverted to the GPU 120 may be at a lower bit-depth than the portion processed by the DPU 127 such that the GPU 120 can properly handle composition processing minimal potential errors. FIGS. 2-6 in concert illustrate the different operation modes that include prioritizing the use of the DPU, operating in the mixer mode using both the DPU and the GPU, and processing solely by the GPU in some cases, as described in details below.

Figure 2:
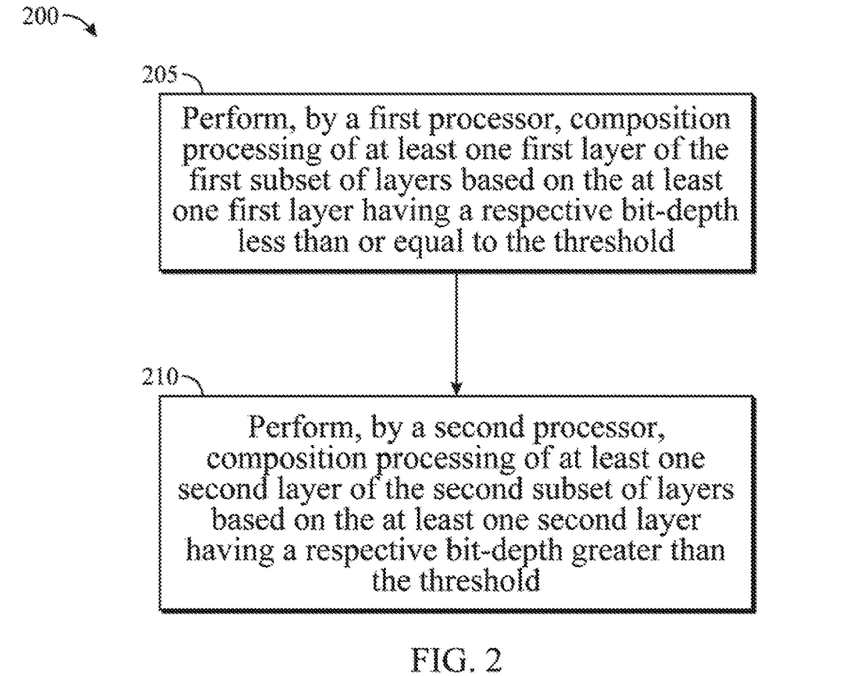
FIG. 2 illustrates example operations for a first device processing a plurality of layers of image data, according to certain aspects of the present disclosure.

FIG. 2 illustrates example operations 200 for a first device, such as the device 104 of FIG. 1, for processing a plurality of layers of image data corresponding to a frame configured to be displayed on a display, according to certain aspects of the present disclosure. At step 205, a first processor performs composition processing of at least one first layer of the first subset of layers based on the at least one first layer having a respective bit-depth less than or equal to the threshold. At step 210, a second processor performs composition processing of at least one second layer of the second subset of layers based on the at least one second layer having a respective bit-depth greater than the threshold. As an example, the operations 200 may be implemented at the one or more determination steps shown in FIG. 4, as further discussed below.

Figure 3:
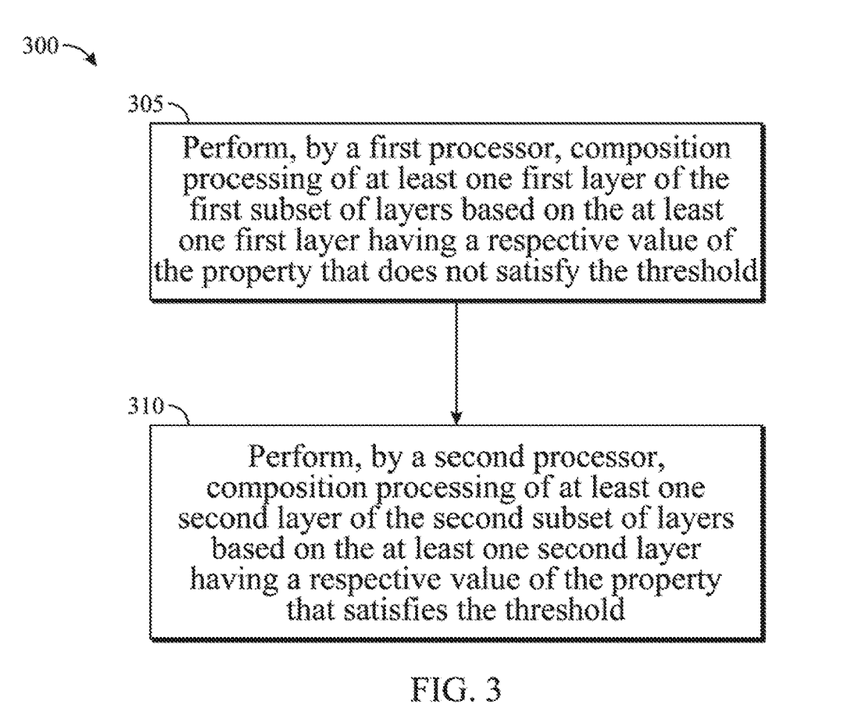
FIG. 3 illustrates example operations for a second device processing a plurality of layers of image data, according to certain aspects of the present disclosure.

FIG. 3 illustrates example operations 300 for a second device, such as another implementation of the device 104 of FIG. 1, for processing a plurality of layers of image data corresponding to a frame configured to be displayed on a display, the plurality of layers comprising a first subset of layers having respective values of a property that do not satisfy a threshold and a second subset of layers having respective values of the property that satisfy the threshold. In some cases, the property may include at least one of bit depths, gamut, or gamma. In some cases, the property may include at least one of resolution, frame rate or refresh rate, bit rate, or overall color depth. For example, at step 305, a first processor performs composition processing of at least one first layer of the first subset of layers based on the at least one first layer having a respective value of the property that does not satisfy the threshold. At step 310, a second processor performs composition processing of at least one second layer of the second subset of layers based on the at least one second layer having a respective value of the property that satisfies the threshold.

In certain aspects, when the property of operations 300 does not refer to bit depths, operations 300 may be performed in the place of operations 200, such as when a second processor is dedicated to perform composition processing of image data of a specific non-bit-depth property. For example, operations 300 using non-bit-depth property may be employed at step 406 as "other strategies" shown in FIG. 4. That is, when the image data does not include a higher bit-depth content than the threshold, in a negative determination at step 404, other properties, such as the overall color depths (considering additional pixel colors, different pixel arrangements, etc.) may be used. The second processor, such as a DPU, may employ native performance efficiency over the image data of other properties as an advantage over the first processor, such as a GPU.

Alternatively, in certain aspects, the operations 300 may be performed together with operations 200, such as in parallel or in series when one of the bit-depth and the non-bit-depth property is prioritized, for distributing processing workload to a first processor and a second processor. For example, when bit-depth processing is prioritized, the first subset and the second subset of layers may be determined by comparing to a bit-depth threshold (as presented in operations 200). In addition, among the second subset of layers, a third subset and a fourth subset of layers may be determined based on a non-bit-depth threshold. In a different embodiment, a non-bit-depth property may be prioritized. As such, two or more properties may be used to prioritize composition processing according to variations of aspects of the present disclosure.

In certain aspects, the first or the second device of operations 200 and operations 300 respectively includes a display, such as the display 136 of the display panel/client 131. In certain aspects, the device includes a display driver circuit, such as display controller 132. In certain aspects, the display driver circuit is configured to convert code words to analog signals for driving output at the display. In certain aspects, the device includes a display processing unit, such as DPU 127. In certain aspects, the display processing unit is configured to provide code words to the display driver circuit for driving output at the display. In certain aspects, the device includes circuitry, such as GPU 120.

In certain aspects, the first processor is configured to utilize a buffer having a size of the threshold for performing composition processing. For example, the buffer may be the buffer 123 of the GPU 120 as shown in FIG. 1. The buffer can be a framebuffer that has the size of 8-bit. As such, the buffer may encounter errors when the image data has a higher bit-depth, such as 10-bit. Therefore, prioritizing the second processer (e.g., a DPU) that is more efficient in processing the high bit-depth content can reduce the chances for encountering errors in the first processor.

In certain aspects, the performing, by the first processor, the composition processing of the at least one first layer is based on performance of composition processing of all of the plurality of layers exceeding a performance metric of the second processor. For example, the first processor may be the GPU 120, and the second processor may be the DPU 127. The performance metric may relate to processing a size, volume, or quantity of data within a period without failure (such as jitter or flicker). For example, when the second processor does not have sufficient capacity or computational power to process a certain size of layers of image data per second without incurring a tolerable error (e.g., a statistical probability), then a portion, such as the first subset, of the plurality of layers image data is handled by the first processor. For example, the determination of whether the DPU 127 is operating within the performance metric is illustrated at the decision block 408 of FIG. 4, and a negative determination at 408 would lead to another determination at 410 and processing the image data in the mixer mode when both the DPU 127 and the GPU 120 are available. An example block diagram 500 of the mixer mode operation is shown in FIG. 5.

Figure 5:
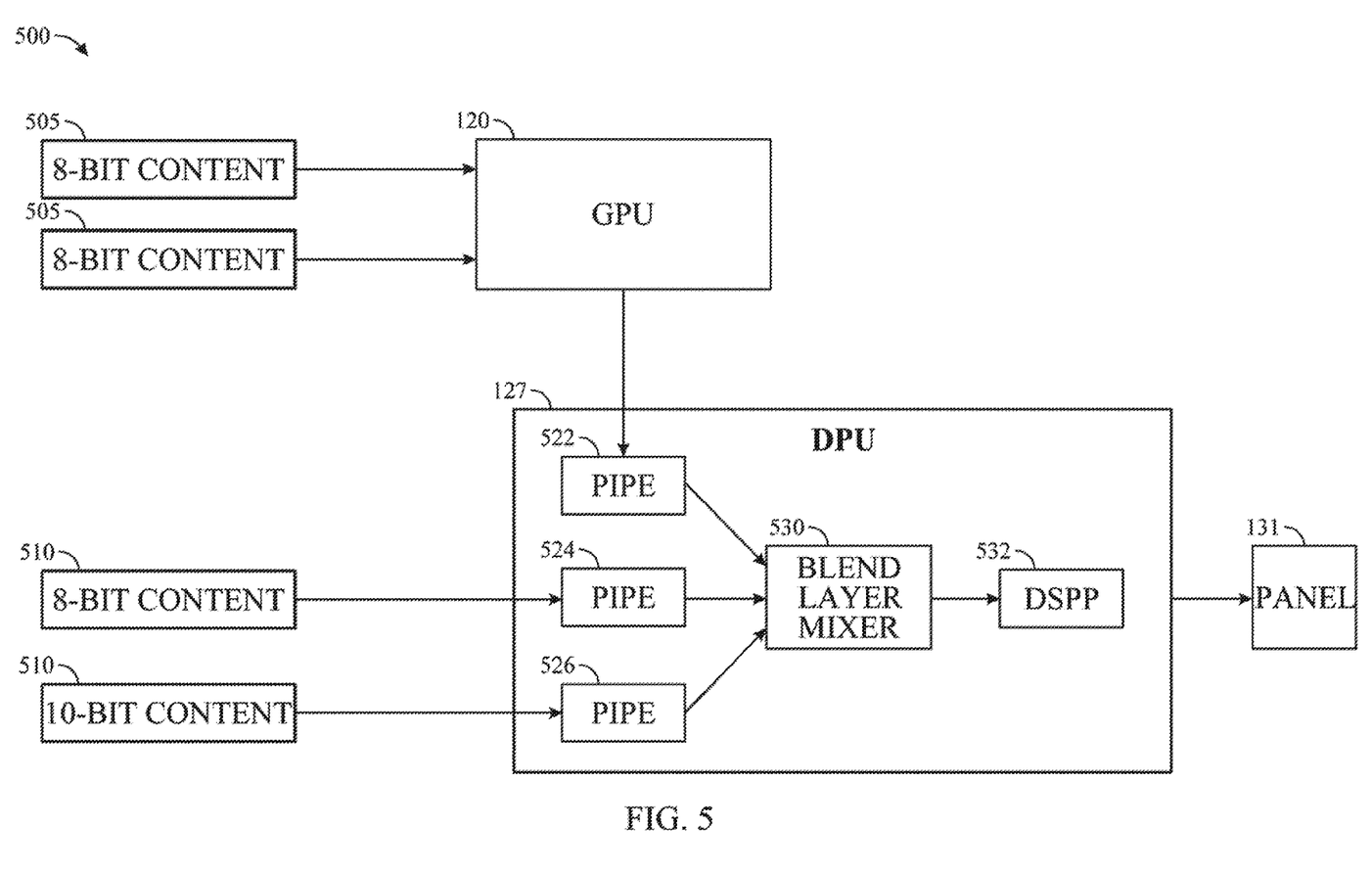
FIG. 5 illustrates an example block diagram for image data processing in a mixer mode by a graphical processing unit and a display processing unit, according to certain aspects of the present disclosure.

Turning now to FIG. 5, the example block diagram 500 is illustrated for image data processing in the mixer mode by a graphical processing unit (e.g., the first processor, the GPU 120) and a display processing unit (e.g., the second processor, the DPU 127), according to certain aspects of the present disclosure. As shown, the first processor, GPU 120, is coupled to the display panel 131 via the second processor, DPU 127.

Multiple layers of image data 505 and 510 are to be processed. The first subset 505 of the image data has a bit-depth of 8-bit. The illustration in FIG. 5 indicates that two graphics pipelines (or two layers) are needed for the first subset 505 of the image data. The second subset 510 of the image data has content of both 8-bit and 10-bit, each corresponding to a respective graphics pipeline or layer. The DPU 127 is shown to include three graphics pipelines 522, 524, and 526. The DPU 127 thus cannot process the total four layers of the first subset 505 and the second subset 510 of the image data.

The GPU 120 may perform composition processing of the two layers of the 8-bit content of the first subset 505 of the image data and send the processed content to the graphics pipeline 522 of the DPU 127. The graphics pipelines 524 and 526 respectively handles the 8-bit and 10-bit content of the second subset 510 of the image data. The blend layer mixer 530 may then process the pipelines 522, 524, and 526 and output the signals to the display surface processor pipe (DSPP) 532, which then sends the display content to the display panel 131.

The example shown in FIG. 5 provides an illustration of prioritizing the 10-bit content of the second subset 510 of the image data to be processed by the DPU 127, and having the 8-bit content processed by the GPU 120, which has a matching 8-bit framebuffer. In this case, the threshold for bit-depth prioritization is 8-bit. For example, at least one layer in the second subset 510 of image data has a respective bit-depth (10-bit) greater than the threshold (8-bit). At least one layer in the first subset 505 of image data has a respective bit-depth (8-bit) less than or equal to the threshold (8-bit). In other implementations, the threshold may be 10-bit or higher; and the DPU 127 may perform composition processing on image data of 12-bit or more.

In certain aspects, the at least one second layer comprises all of the second subset of layers, wherein the at least one first layer comprises all of the first subset of layers. In other words, the GPU 120 processes all of the first subset 505 of the layers of the image data; and the DPU 127 processes all of the second subset 510 of the layers of the image data. Otherwise, another GPU may be implemented to perform composition processing of the remaining layers of the total image data (e.g., when the total processing workload exceeds the combined capacity of the GPU 120 and the DPU 127).

In certain aspects, the DPU 127 performs composition processing of all layers of second image data corresponding to a second frame based on performance of composition processing of all layers of the second image data meeting the performance metric. The layers of the second image data includes one or more first layers having respective bit-depths less than or equal to the threshold and one or more second layers having respective bit-depths greater than the threshold. For example, in a second frame, the DPU 127 has capacity to process all layers of the image data, and thus needs not divert processing workload to the GPU 120. In other words, the mixer mode that employs the assistance of the GPU 120 may be dynamic and change on demand frame-by-frame, thus prioritizing the use of the DPU 127 for its performance and energy efficiency. An example of the DPU 127 performing composition processing of both the first subset 505 and the second subset 510 of the image data is shown in FIG. 6.

Figure 6:
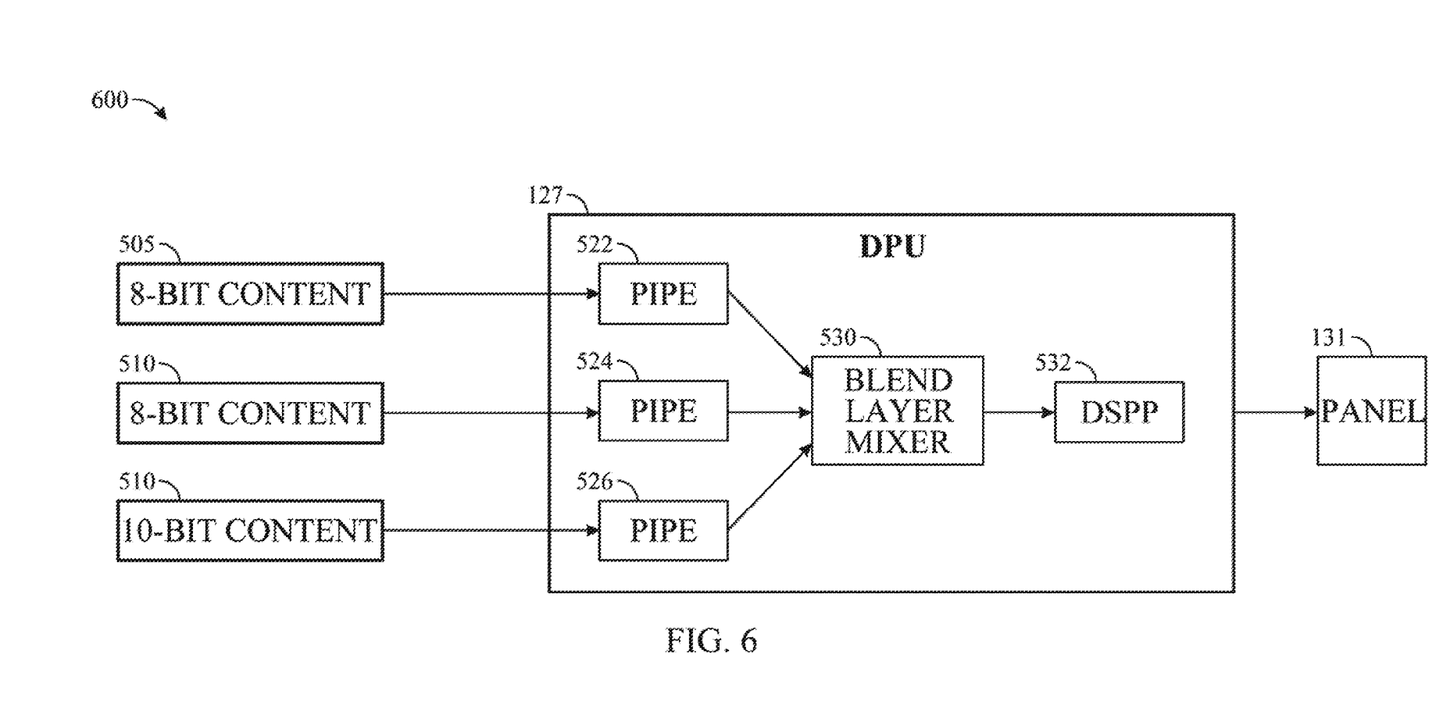
FIG. 6 illustrates an example block diagram for image data processing by a display processing unit, according to certain aspects of the present disclosure.

Turning now to FIG. 6, an example block diagram 600 for image data processing by the DPU 127 is shown, according to certain aspects of the present disclosure. Unlike the block diagram 500, the first subset 505 of image data includes one layer (instead of two). Thus, the pipelines 522, 524, and 526 can respectively process each layer of the first subset 505 and the second subset 510.

In certain aspects, such as when the DPU 127 has limited capacity or impaired functionalities, or when configurations or user settings require so, the GPU 120 performs composition processing of all layers of second image data corresponding to a second frame. For example, this situation is indicated by the negative determination at step 410 and the operation at step 412 in FIG. 4. The layers of the second image data include one or more first layers having respective bit-depths less than or equal to the threshold and one or more second layers having respective bit-depths greater than the threshold. The GPU 120 performs composition processing of all layers of the second image data based on performance of composition processing of the one or more second layers exceeding a performance metric of the second processor. As such, the GPU 120 may handle all image data processing when the DPU 127 is not available, such as in a safe-mode operation of the DPU 127.

In certain aspects, the at least one second layer includes all of the second subset of layers. The at least one first layer includes a number of layers less than all of the first subset of layers. For example, when the DPU 127 has additional capacity to handle more composition processing, the DPU 127 performs composition processing of layers of the first subset of layers other than the at least one first layer based on performance of composition processing of the layers of the first subset of layers (by the GPU 120) other than the at least one first layer and the second subset of layers meeting the performance metric. This is another example for operations in the mixer mode.

In certain aspects, operations 200 or 300 further include dividing layers of the plurality of layers among the first processor and the second processor for composition processing by prioritizing the second subset of layers to be processed by the second processor over the first subset of layers being processed by the second processor and having the first processor process any layers not processed by the second processor.

Figure 4:
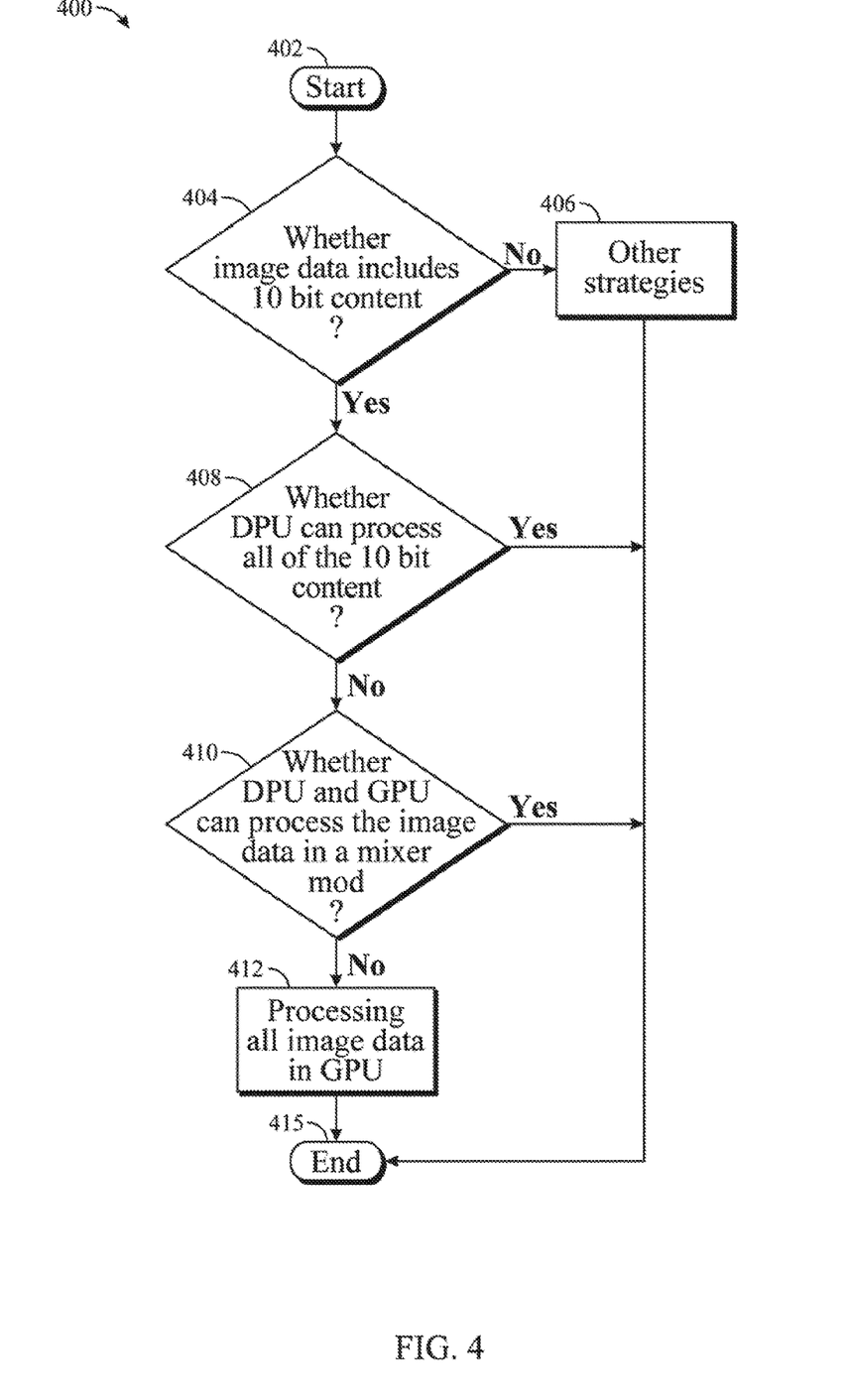
FIG. 4 illustrates an example flowchart for image data processing, according to certain aspects of the present disclosure.

In one example piecing the aforementioned aspects together, FIG. 4 illustrates a flowchart 400 for image data processing, according to aspects of the present disclosure. The flowchart 400 starts at 402, at which a plurality of layers of image data are received or generated in a device or system for composition processing. At 404, the device or system determines whether the image data includes a high bit-depth content, such as 10-bit. This determination step prioritizes high bit-depth image data. The format of the image content is checked at the beginning of composition strategy. Upon a determination that the image data includes high bit-depth content, the bit-depth prioritization strategy is selected and the operation moves on to step 408. Otherwise, other strategies, such as prioritizing overall color depths, resolution, gamut, or other properties of the image data (as discussed in operations 300 above) may be chosen at step 406.

At 408, the device or system first attempts to perform composition processing all of the image data with the DPU. At the same time, performance metrics are measured regarding the DPU's performance. Upon detecting that the performance metrics does not meet certain criteria, that is, upon determining that the DPU cannot process all of the 10-bit content, the device or system enters the mixer mode to engage assistance from the GPU, at 410.

At 410, 10-bit or higher image contents are marked and for DPU processing only. The rest of the lower bit-depth image content may be processed using other composition strategies. As such, DPU may perform composition processing over as many layers as possible, especially the higher bit-depth layers, to optimize performance and output accuracy. Layers of lower bit-depths, such as 8-bit content, can be competently processed by the GPU.

Upon detecting that the DPU has diminished processing performance at step 410, and that the mixer mode cannot properly perform composition processing of any of the image data, the device or system may enter a safe mode by processing all the image data in the GPU, at step 412.

Upon completion, such as by different strategies at 406, by DPU only mode at 408, by the mixer mode at 410, or the GPU only mode at 412, the flow chart 400 ends at 415.

The present disclosure provides unique advantages by prioritizing bit-depth content to be processed by the DPU. In some cases, when the image data include 6-10 layers, and the layers are all of 8-bit depth, and the DPU alone cannot process the layers, the system may operate in the mixer mode or the GPU only mode because the framebuffer of the GPU is also 8-bit. However, when at least one of layers is of 10-bit, then the system may engage DPU only or the mixer mode. Sending part or all of the layers to the DPU, as discussed above, improves performance and accuracy. In some cases, when at least one of the layers has updated gamut or gamma, the high bit-depth content would still be prioritized for processing at the DPU.

In one configuration, a method or apparatus for display processing is provided. The apparatus may be a processing unit, a display processor, a display processing unit (DPU), a GPU), a video processor, or some other processor that can perform display processing. In some examples, the apparatus may be the GPU 120 within the device 104, or may be some other hardware within the device 104, or another device. The apparatus may include means for displaying. The apparatus further includes means for processing a plurality of layers of image data corresponding to a frame configured to be displayed on a display, the plurality of layers comprising a first subset of layers having respective bit-depths less than or equal to a threshold and a second subset of layers having respective bit-depths greater than the threshold.

The subject matter described herein can be implemented to realize one or more benefits or advantages. For instance, the described display and/or graphics processing techniques can be used by a display processor, a display processing unit (DPU), a GPU, or a video processor or some other processor that can perform display processing to handle high bit-depth image data without interruption or flickering. In general, examples disclosed herein provide techniques for processing layers of image data corresponding to a frame configured to be displayed on a display, when the layers have various bit-depth properties that at least some of the bit-depth properties are different from the framebuffer size of the GPU memory.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

The invention claimed is:

1. A method for processing a plurality of layers of image data corresponding to a frame configured to be displayed on a display, the plurality of layers comprising a first subset of layers having respective bit-depths less than or equal to a threshold and a second subset of layers having respective bit-depths greater than the threshold, the method comprising:
performing, by a first processor, composition processing of at least one first layer of the first subset of layers based on the at least one first layer having a respective bit-depth less than or equal to the threshold;
performing, by a second processor, composition processing of at least one second layer of the second subset of layers based on the at least one second layer having a respective bit-depth greater than the threshold; and
dividing layers of the plurality of layers among the first processor and the second processor for composition processing by prioritizing the second subset of layers to be processed by the second processor over the first subset of layers being processed by the second processor and having the first processor process any layers not processed by the second processor.

2. The method of claim 1, wherein the performing, by the first processor, the composition processing of the at least one first layer is based on performance of composition processing of all of the plurality of layers exceeding a performance metric of the second processor.

3. The method of claim 2, wherein the at least one second layer comprises all of the second subset of layers, wherein the at least one first layer comprises less than all of the first subset of layers, and further comprising:
performing, by the second processor, composition processing of layers of the first subset of layers other than the at least one first layer based on performance of composition processing of the layers of the first subset of layers other than the at least one first layer and the second subset of layers meeting the performance metric.

4. The method of claim 2, wherein the at least one second layer comprises all of the second subset of layers, wherein the at least one first layer comprises all of the first subset of layers.

5. The method of claim 2, further comprising:
performing, by the second processor, composition processing of all layers of second image data corresponding to a second frame based on performance of composition processing of all layers of the second image data meeting the performance metric, the layers of the second image data including one or more first layers having respective bit-depths less than or equal to the threshold and one or more second layers having respective bit-depths greater than the threshold.

6. The method of claim 2, further comprising:
performing, by the first processor, composition processing of all layers of second image data corresponding to a second frame, the layers of the second image data including one or more first layers having respective bit-depths less than or equal to the threshold and one or more second layers having respective bit-depths greater than the threshold, wherein the first processor performs composition processing of all layers of the second image data based on performance of composition processing of the one or more second layers exceeding a performance metric of the second processor.

7. The method of claim 1, wherein the first processor is configured to utilize a buffer having a size of the threshold for performing composition processing.

8. The method of claim 1, wherein:
having a respective bit-depth greater than the threshold comprises having a bit-depth of 10; and
having a respective bit-depth less than or equal to the threshold comprises having a bit-depth of 8.

9. The method of claim 1, wherein:
the first processor comprises a graphics processing unit (GPU); and
the second processor comprises a display processing unit (DPU).

10. The method of claim 9, wherein the first processor is coupled to the display via the second processor.

11. An apparatus for processing a plurality of layers of image data corresponding to a frame configured to be displayed on a display, the plurality of layers comprising a first subset of layers having respective bit-depths less than or equal to a threshold and a second subset of layers having respective bit-depths greater than the threshold, the apparatus comprising:
a memory;
a first processor configured to perform composition processing of at least one first layer of the first subset of layers based on the at least one first layer having a respective bit-depth less than or equal to the threshold; and
a second processor configured to perform composition processing of at least one second layer of the second subset of layers based on the at least one second layer having a respective bit-depth greater than the threshold,
wherein the second processor is further configured to perform composition processing of all layers of second image data corresponding to a second frame based on performance of composition processing of all layers of the second image data meeting the performance metric, the layers of the second image data including one or more first layers having respective bit-depths less than or equal to the threshold and one or more second layers having respective bit-depths greater than the threshold.

12. The apparatus of claim 11, wherein the first processor is further configured to perform the composition processing of the at least one first layer based on performance of composition processing of all of the plurality of layers exceeding a performance metric of the second processor.

13. The apparatus of claim 12, wherein:
the at least one second layer comprises all of the second subset of layers;
the at least one first layer comprises less than all of the first subset of layers; and
the second processor is further configured to perform composition processing of layers of the first subset of layers other than the at least one first layer based on performance of composition processing of the layers of the first subset of layers other than the at least one first layer and the second subset of layers meeting the performance metric.

14. The apparatus of claim 12, wherein the at least one second layer comprises all of the second subset of layers, wherein the at least one first layer comprises all of the first subset of layers.

15. The apparatus of claim 12, wherein the first processor is further configured to perform composition processing of all layers of second image data corresponding to a second frame, the layers of the second image data including one or more first layers having respective bit-depths less than or equal to the threshold and one or more second layers having respective bit-depths greater than the threshold, wherein the first processor performs composition processing of all layers of the second image data based on performance of composition processing of the one or more second layers exceeding a performance metric of the second processor.

16. The apparatus of claim 11, wherein the first processor or the second processor is further configured to divide layers of the plurality of layers between the first processor and the second processor for composition processing by:
prioritizing the second subset of layers to be processed by the second processor over the first subset of layers being processed by the second processor and
having the first processor process any layers not processed by the second processor.

17. The apparatus of claim 11, wherein the first processor is configured to utilize a buffer having a size of the threshold for performing composition processing.

18. The apparatus of claim 11, wherein:
the at least one first layer of the first subset of layers having a respective bit-depth greater than the threshold comprises the first subset of layers having a bit-depth of 10; and
the at least one second layer of the second subset of layers having a respective bit-depth less than or equal to the threshold comprises the second subset of layers having a bit-depth of 8.

19. The apparatus of claim 11, wherein:
the first processor comprises a graphics processing unit (GPU); and
the second processor comprises a display processing unit (DPU).

20. The apparatus of claim 19, wherein the first processor is coupled to the display via the second processor.

21. A non-transitory computer readable medium having instructions stored thereon that, when executed by a set of processors comprising a first processor and a second processor, cause the set of processors to perform a method for processing a plurality of layers of image data corresponding to a frame configured to be displayed on a display, the plurality of layers comprising a first subset of layers having respective bit-depths less than or equal to a threshold and a second subset of layers having respective bit-depths greater than the threshold, the method comprising:
performing, by the first processor, composition processing of at least one first layer of the first subset of layers based on the at least one first layer having a respective bit-depth less than or equal to the threshold;
performing, by the second processor, composition processing of at least one second layer of the second subset of layers based on the at least one second layer having a respective bit-depth greater than the threshold; and
dividing layers of the plurality of layers among the first processor and the second processor for composition processing by prioritizing the second subset of layers to be processed by the second processor over the first subset of layers being processed by the second processor and having the first processor process any layers not processed by the second processor.

22. A method for processing a plurality of layers of image data corresponding to a frame configured to be displayed on a display, the plurality of layers comprising a first subset of layers having respective values of a property that do not satisfy a threshold and a second subset of layers having respective values of the property that satisfy the threshold, the method comprising:
performing, by a first processor, composition processing of at least one first layer of the first subset of layers based on the at least one first layer having a respective value of the property that does not satisfy the threshold; and
performing, by a second processor, composition processing of at least one second layer of the second subset of layers based on the at least one second layer having a respective value of the property that satisfies the threshold; and
dividing layers of the plurality of layers among the first processor and the second processor for composition processing by prioritizing the second subset of layers to be processed by the second processor over the first subset of layers being processed by the second processor and having the first processor process any layers not processed by the second processor.

23. The method of claim 22, wherein the property comprises at least one of bit depths, gamut, or gamma.

* * * * *